UNITED STATES PATENT OFFICE.

KENNETH B. HOWELL, OF SCHENECTADY, NEW YORK, ASSIGNOR TO GENERAL ELECTRIC COMPANY, A CORPORATION OF NEW YORK.

RESINOUS CONDENSATION PRODUCT AND PROCESS OF MAKING THE SAME.

1,098,728. Specification of Letters Patent. Patented June 2, 1914.

No Drawing. Application filed July 25, 1913. Serial No. 781,103.

*To all whom it may concern:*

Be it known that I, KENNETH B. HOWELL, a citizen of the United States, residing at Schenectady, in the county of Schenectady, State of New York, have invented certain new and useful Improvements in Resinous Condensation Products and Process of Making the Same, of which the following is a specification.

The present invention comprises a new resinous material suitable for electrical insulation, varnishes, molded materials and the like, and is particularly characterized by possessing flexibility and elasticity. Glycerol and other polyhydric alcohols combine with polybasic organic acids, for example, phthalic acid, at an elevated temperature to form resins. These resins apparently are esters of complex molecular structures. Most of these resins, while stronger and tougher than the phenol resins, are still quite brittle when cold.

It is the object of my invention to provide resinous materials of this general nature which are pliable and elastic at ordinary temperatures.

In accordance with the invention an unsaturated ester, containing uncombined hydroxyl groups, is first made and is then acted upon at an elevated temperature by means of castor oil until combination takes place.

I will illustrate my invention by describing the process in detail with respect to the formation of a resin into the composition of which glycerol and phthalic anhydrid enter but I wish it to be understood that the process is equally applicable to the formation of resins containing other polybasic acids, for example, camphoric acids, cinnamic acid, citric acid and the like. Glycol, mannitol and other alcohols may likewise be substituted in some cases for glycerin.

Molecular proportions of glycerol and phthalic anhydrid are first brought into combination to form a basic ester. Accordingly about 184 parts of glycerin and 296 parts of phthalic anhydrid by weight are heated in a suitable open retort. The temperature may be quickly carried to about 130° C. and then gradually raised until the mass attains a temperature of about 180° C., the heating rate being determined by maintaining a moderate rate of evolution of gas bubbles. Ordinarily this stage of the process will require about one hour, if care is exercised not to have it proceed too violently. About 320 parts of castor oil are then added, although a lesser amount may in some cases also be used with a corresponding sacrifice of elasticity in the product. The relative amounts of glycerin and phthalic anhydrid may also be varied. For example, I have used 184 parts of glycerin, 370 parts of phthalic anhydrid, and 368 parts of castor oil. Castor oil is a glycerin ester of mainly ricinoleic and isoricinoleic acids, although it also contains various other esters in small amounts. The oil first forms a distinct layer, but upon continued heating a combination appears to take place and a homogeneous liquid is formed. The heating may be stopped when the boiling point of the mass has reached 220° C., the time for the reaction up to this point requiring about 1½ hours. The heating may be continued to a higher temperature. When the reaction is stopped at a temperature of about 220° C. a longer time will be required for the final polymerization and hardening of the resin at a subsequent stage than if the heating is continued. The condition of the material depends both on the temperature and the time, a short heating period at a higher temperature range has much the same effect as a longer heating period, at a lower temperature. If the temperature were raised from 220° C. to about 280° C. in about one hour, a violent evolution of gas would take place at about 280° C. and the mass would become an infusible and insoluble honeycombed solid. If the heating is stopped at a point short of the infusible stage, a yellowish-brown resin is produced soluble in a mixture of about three parts of benzol and one part of alcohol. It is substantially insoluble in benzol.

The resinous material in the fusible stage may be used while fused for insulating or coating purposes, but preferably it is thinned by adding a solvent, such as benzol and alcohol. The solution may be used as a varnish or an impregnant for fibrous or porous materials. The solvent may be evaporated when desired either by merely exposing the material to the open air or by heating it in a closed or evacuated container.

By heating for a length of time depending upon the finishing temperature of the material in the first stage of the reaction, the resin may be rendered insoluble and infusible without becoming porous. For example, if the first stage of the reaction was interrupted when the boiling point was about 220° C., about 18 hours will be required to harden the product at about 150° C. The hardening may be hastened by raising the temperature as high as about 220° C. The material finished at a higher temperature in the first part of the reaction, of course, will require less heating.

It is evident that chemical combination of the resin and the oil has taken place, as the oily layer commingles with the resin and cannot be extracted after hardening by means of organic solvents. The oil cannot be brought into combination with the same effect with a neutral ester containing no free hydroxyl. In my opinion these facts point to a chemical combination of the ricinoleic and isoricinoleic acids and the uncombined hydroxyl groups. Undoubtedly some dissociation of the castor oil takes place and as fast as the ricinoleic acid combines with the resin, the dissociation continues. The free glycerol is probably driven off by the heating.

The final product when hardened is a reddish brown elastic material which is transparent in relatively thin layers. Before hardening it is somewhat lighter in color. The hardened resin is entirely unattacked by methyl alcohol, or acetone. The ordinary gylcerin phthalate swells into a gelatinous sticky mass in contact with these solvents. It is less attacked by alkalis, and concentrated acids than the glycerin phthalate.

What I claim as new and desire to secure by Letters Patent of the United States, is:—

1. The process which consists in heating a mixture of castor oil and an ester of a polyhydric alcohol and a polybasic acid containing free hydroxyl groups until a flexible resin, soluble in a benzol-alcohol mixture, is formed in which castor oil forms an indistinguishable part.

2. The process of making a resinous composition which consists in heating a glycerol ester of phthalic anhydrid containing uncombined hydroxyl with castor oil until the oil is incorporated to form a resin convertible by heating to a substantially insoluble, infusible, flexible, elastic resin.

3. The process which consists in heating about 184 parts by weight of glycerin and 296 parts of phthalic anhydrid until reaction is substantially complete, adding about 320 parts of castor oil and continuing the heating at a higher temperature until a substantially homogenous resin is produced.

4. A resinous material formed from castor oil and an unsaturated ester of a polyhydric alcohol and a polybasic acid, said resin being soluble in a mixture of benzol and alcohol, fusible without decomposition, and convertible to an insoluble, infusible, pliable, elastic material.

5. A resin formed from a glycerin phthalate containing uncombined hydroxyl and castor oil, soluble in a mixture of benzol and alcohol, fusible without decomposition, and convertible by heat to an insoluble, infusible, pliable, elastic resin.

In witness whereof, I have hereunto set my hand this 18th day of July, 1913.

KENNETH B. HOWELL.

Witnesses:
BENJAMIN B. HULL,
HELEN ORFORD.